US008867566B2

United States Patent
Gill et al.

(10) Patent No.: US 8,867,566 B2
(45) Date of Patent: Oct. 21, 2014

(54) METHODS OF HEADER COMPRESSION WITHIN A WIRELESS COMMUNICATIONS NETWORK

(75) Inventors: Harleen K. Gill, San Diego, CA (US); Arul Ananthanarayanan, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 957 days.

(21) Appl. No.: 12/195,064

(22) Filed: Aug. 20, 2008

(65) Prior Publication Data

US 2010/0046544 A1 Feb. 25, 2010

(51) Int. Cl.
*H04J 3/16* (2006.01)
*H04L 29/06* (2006.01)
*H04W 76/00* (2009.01)

(52) U.S. Cl.
CPC ............. *H04L 69/04* (2013.01); *H04L 65/4061* (2013.01); *H04L 69/22* (2013.01); *H04W 76/005* (2013.01)
USPC ........................................................ 370/466

(58) Field of Classification Search
None
See application file for complete search history.

(56) References Cited

U.S. PATENT DOCUMENTS

| | | | |
|---|---|---|---|
| 7,006,472 B1 * | 2/2006 | Immonen et al. ............. | 370/332 |
| 2002/0038385 A1 | 3/2002 | Kalliokulju | |
| 2002/0038395 A1 | 3/2002 | Onishi | |
| 2002/0097723 A1 * | 7/2002 | Tourunen et al. ............. | 370/392 |
| 2002/0181400 A1 | 12/2002 | Zheng et al. | |
| 2003/0179713 A1 | 9/2003 | Fleming | |
| 2006/0109829 A1 | 5/2006 | O'Neill | |
| 2007/0049314 A1 | 3/2007 | Balachandran et al. | |
| 2008/0119172 A1 * | 5/2008 | Rao et al. ................... | 455/414.1 |
| 2009/0028096 A1 | 1/2009 | Harada et al. | |

FOREIGN PATENT DOCUMENTS

| | | |
|---|---|---|
| CN | 1324537 A | 11/2001 |
| CN | 1602616 A | 3/2005 |

(Continued)

OTHER PUBLICATIONS

International Search Report, PCT/US2009/054258, International Searching Authority, European Patent Office, Dec. 17, 2009.

(Continued)

*Primary Examiner* — Chi Pham
*Assistant Examiner* — Kouroush Mohebbi
(74) *Attorney, Agent, or Firm* — Michael F. Taveira

(57) ABSTRACT

Embodiments of the invention disclose header compression within a wireless communications network. In an example, the method includes establishing, between an access network and an access terminal, a flow identifier (ID) and mapping protocol to support header compression for packets sent to the access network from the access terminal and intended for an application server. The mapping protocol can be configured to convert packets including the flow ID into packets that conform with a given addressing protocol for routing to the application server. The access terminal sends and the access network receives a first packet of a stream of packets. The first packet includes the flow ID and is in a compressed format compared to that of the same packet conforming with the given addressing protocol. The access network converts the received first packet into a routing packet based on the mapping protocol that conforms with the given addressing protocol.

60 Claims, 6 Drawing Sheets

(56) References Cited

FOREIGN PATENT DOCUMENTS

| | | |
|---|---|---|
| JP | 2003511981 T | 3/2003 |
| JP | 2004511178 A | 4/2004 |
| JP | 2005217626 A | 8/2005 |
| JP | 2007214702 A | 8/2007 |
| JP | 2008502213 A | 1/2008 |
| JP | 2009021836 A | 1/2009 |
| WO | 0128180 A2 | 4/2001 |
| WO | 0230043 A2 | 4/2002 |

OTHER PUBLICATIONS

Written Opinion, PCT/US2009/054258, International Searching Authority, European Patent Office, Dec. 17, 2009.
Ericsson et al., "3GPP TSG SA WG2 Meeting #65 S2-084064, Dec. 5, 2008."

* cited by examiner

METHODS OF HEADER COMPRESSION WITHIN A WIRELESS COMMUNICATIONS NETWORK

BACKGROUND OF THE INVENTION

1. Field of the Invention

The invention relates to methods of header compression within a wireless communications network.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments of the invention are related to header compression within a wireless communications network. In an example, the method includes establishing, between an access network and an access terminal, a flow identifier (ID) and mapping protocol to support header compression for packets sent to the access network from the access terminal and intended for an application server (e.g., a push-to-talk (PTT) server). The mapping protocol can be configured to convert packets including the flow ID into packets that conform with a given addressing protocol (e.g., IPv4, IPv6, etc.) for routing to the application server. The access terminal sends and access network receives a first packet of a stream of packets, wherein the first packet includes the flow ID and is in a compressed format compared to that of the same packet conforming with the given addressing protocol. The access network converts the received first packet into a routing packet based on the mapping protocol. The converted routing packet conforms with the given addressing protocol. The access network then forwards the converted routing packet to the application server based on the given addressing protocol.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
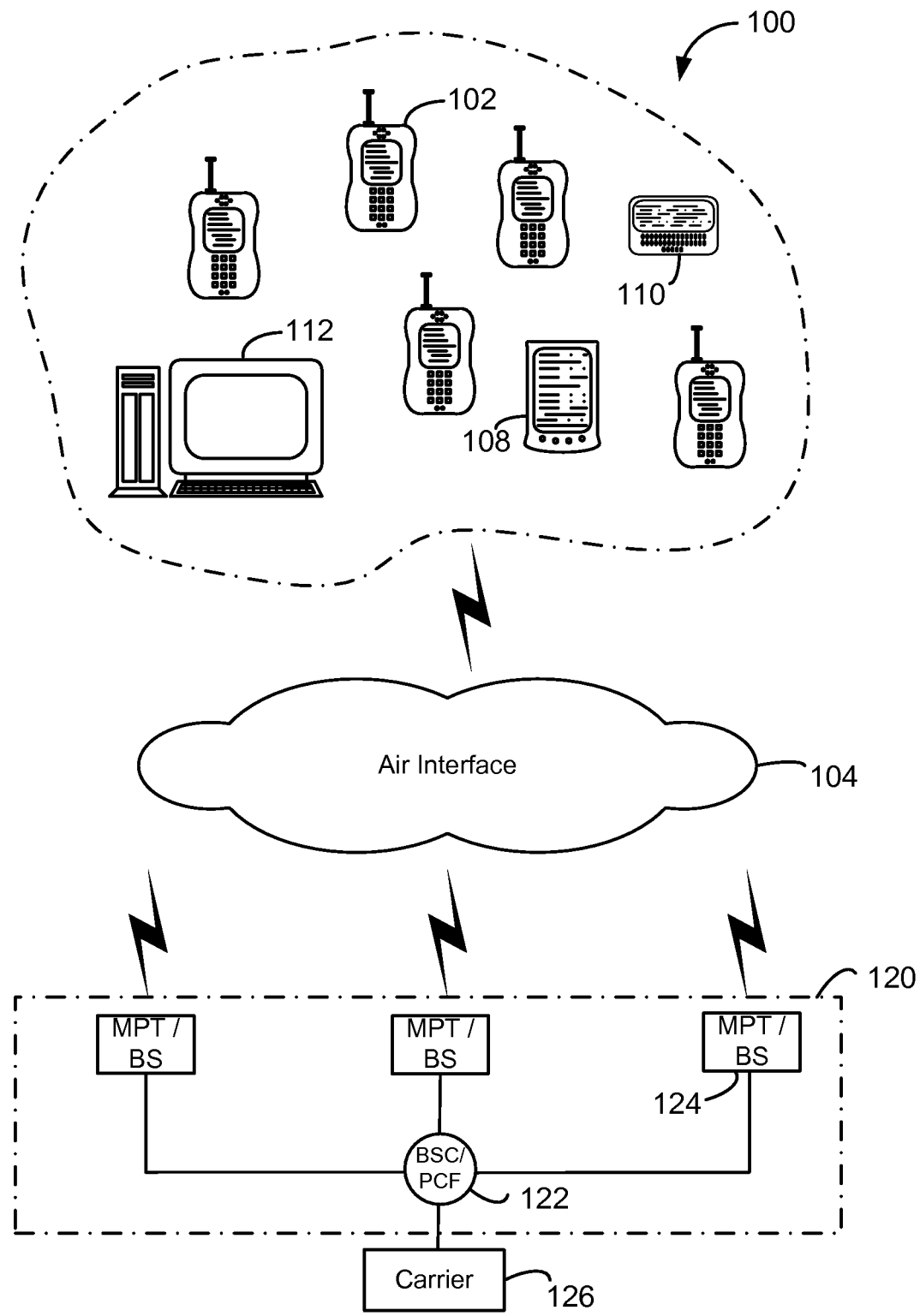
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2:
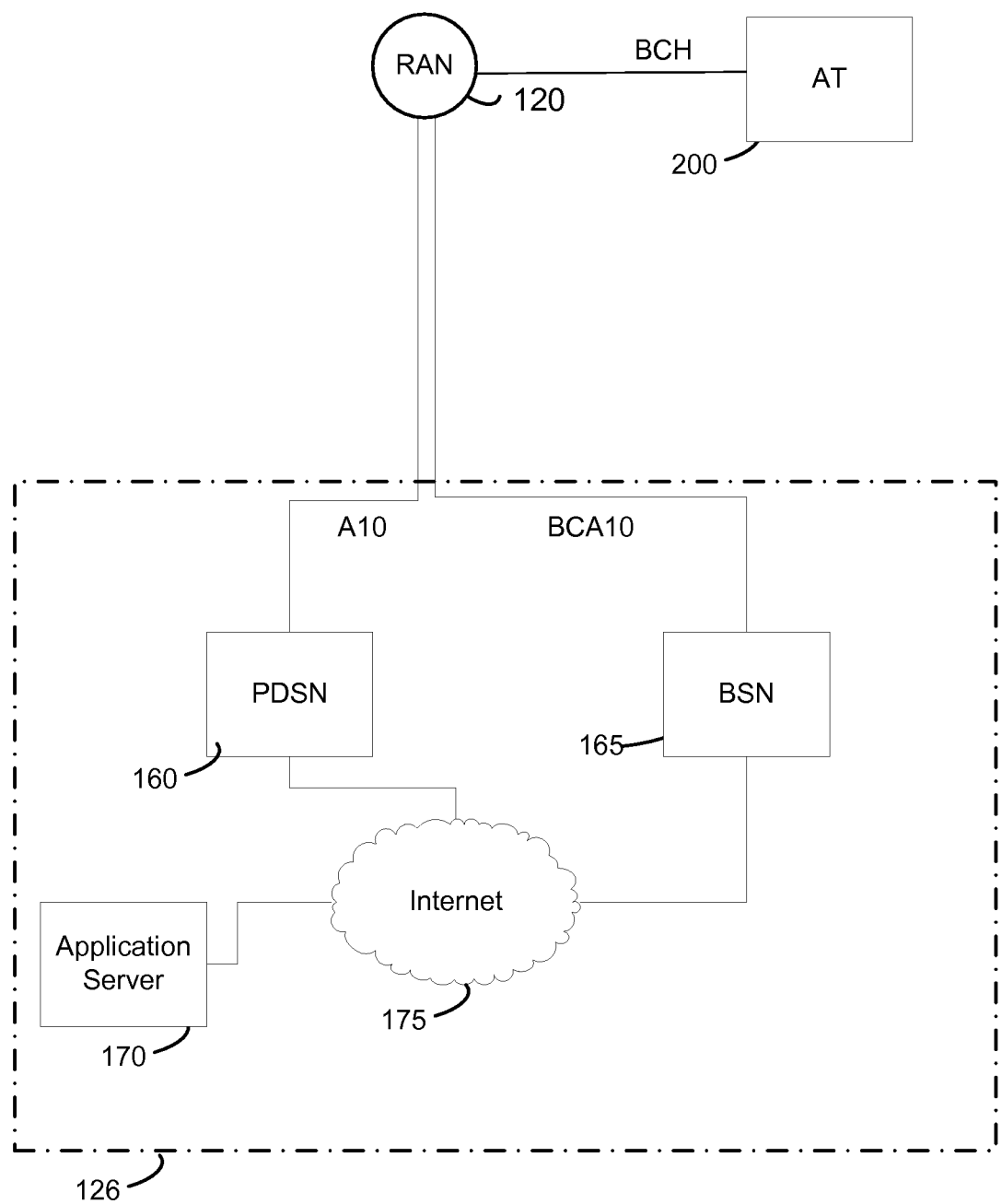
FIG. 2 illustrates the carrier network according to an example embodiment of the present invention.

FIG. 2 illustrates the carrier network 126 according to an embodiment of the present invention. In the embodiment of FIG. 2, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2, the PDSN 160 may communicate with the RAN 120 (e.g., the BSC/PCF 122) via a conventional A10 connection. The A10 connection is well-known in the art and will not be described further for the sake of brevity.

Referring to FIG. 2, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 3:
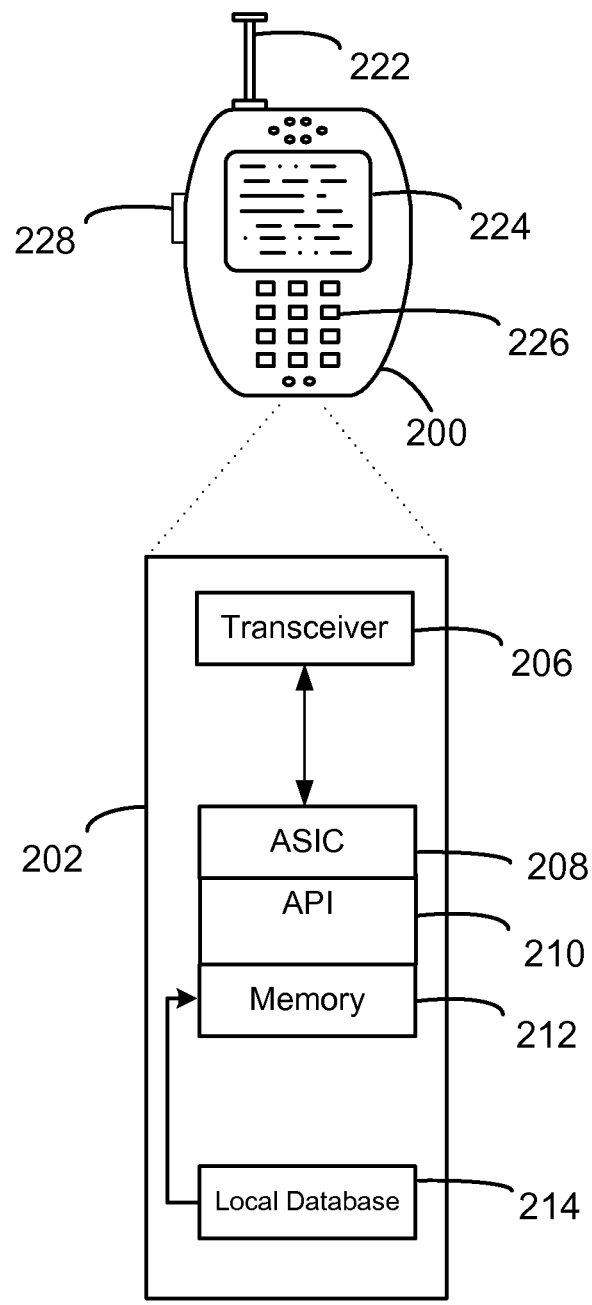
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Conventional Reverse Link Packet Transmission

Figure 4:
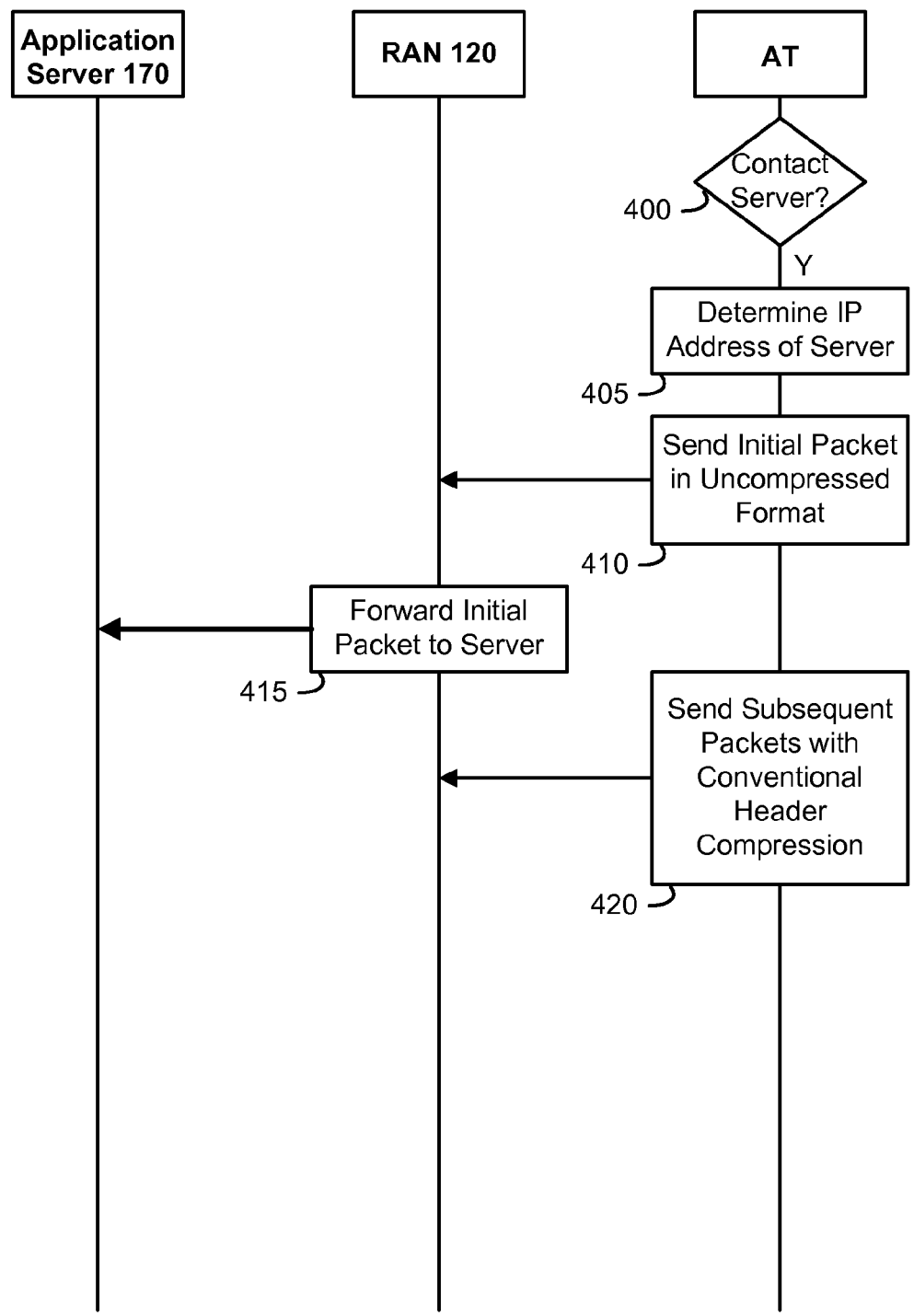
FIG. 4 illustrates a conventional manner of transmitting packets from an access terminal to the application server.

FIG. 4 illustrates a conventional manner of transmitting packets from an access terminal to the application server 170.

In an example, the application server 170 can be a multicast server supporting multicasting operations within the system 100. In this example, the access terminal transmitting the packets in FIG. 4 can be either an originator of a multicast or PTT call, or alternatively can be a target access terminal responding to an announce message for the multicast or PTT call. In an alternative example, the access terminal transmitting the packets in FIG. 4 can be responding to an announce message announcing a unicast call, or can be initiating a unicast call (i.e., not in response to an announce message).

In 400 of FIG. 4, a given AT within system 100 determines whether to contact (e.g., send one or more packets to) the application server 170. For example, if the given AT has received an announce message for a multicast session and decides to participate in the announced multicast or push-to-talk (PTT) session, the given AT determines, in 400, to contact the application server 170. In another example, if the given AT has received an announce message for a unicast session and decides to answer the unicast call, the given AT determines, in 400, to contact the application server 170. In yet another example, the given AT can determine to initiate contact with the application server 170 on its own. In 405, the given AT determines the internet protocol (IP) address of the application server 170. The IP address of the application server 170 may be determined based on an IP address discovery process (e.g., the given AT requests the IP address of the application server 170 via the RAN 120), the IP address of the application server 170 can already be known based on a previous discovery process, or the IP address of the application server 170 can be stored locally at the given AT in association with a service offered by the application server 170 (e.g., a multicast or PTT service).

In an example, if the system 100 is operating in accordance with IP version 4 (IPv4) protocols, the IP address determined in 405 includes 4 bytes, or 32 bits. If the system 100 is operating in accordance with IP version 6 (IPv6) protocols, a much larger address space (e.g., 32 bytes) is provided as compared to IPv4 (e.g., up to $2^{128}$ potential IP addresses).

Because a relatively large address space is allocated to IPv6, less than all of that address space need be used to uniquely identify network entities (e.g., the given AT, the application server 170, etc.). Accordingly, the IPv6 address space can be viewed as including (i) a unique addressing portion that identifies a network entity and (ii) a prefix portion that is not used to identify the network entity.

Returning to FIG. 4, in 410, the given AT sends an initial packet to the RAN 120 on an uplink channel (e.g., a CDMA common uplink channel, such as an Access Channel or Control Channel). The initial packet is sent in an "uncompressed" format. As will be described in greater detail below, conventional compression of address headers is typically invoked only after a first, uncompressed address header is sent along with an initial packet. Assuming that the system 100 is configured to implement IPv6 addressing protocols, the configuration of the initial packet sent in 410 may be as follows:

| Addressing Portion | | | | |
|---|---|---|---|---|
| Source | | Destination | | Data Portion |
| S(1) | S(2) | D(1) | D(2) | DATA |

IPv6 Packet Configuration wherein S(1) denotes the prefix portion for the "source" or sending entity of the packet, such as the given AT in 410, S(2) denotes the unique addressing portion identifying the given AT, D(1) denotes the prefix portion for the "destination" or target entity of the packet, such as the application server 170 in 410, and D(2) denotes the unique addressing portion identifying the application server 170. The packet further includes a payload or data portion DATA.

In 415, the RAN 415 receives the initial uncompressed packet and forwards the packet to the application server 170. Next, in 420, the given AT can send subsequent packets to the application server 170 via the RAN 120 employing conventional header compression techniques. For example, Robust Header Compression (RoHC) may be used to compress headers of the subsequent packets, as is known in the art. As will be appreciated by one of skill in the art, however, conventional header compression methodologies, such as ROHC, typically require that the initial packet in the data stream be sent in an uncompressed format before compression can be relied upon. Because the initial packets can often be sent on bandwidth-limited channels, initial uncompressed packets can reduce the amount of available bandwidth on uplink channels.

Figure 5:
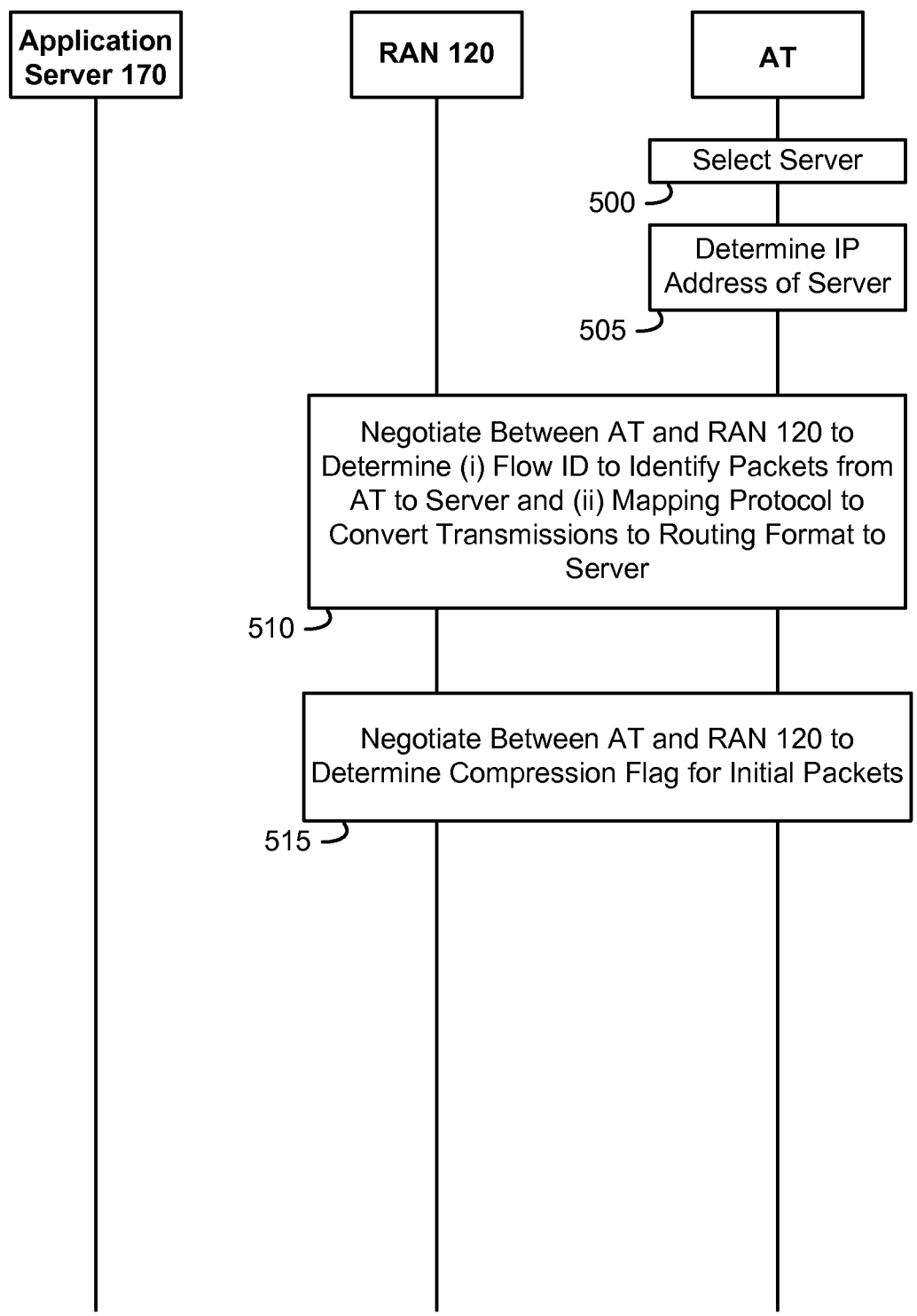
FIG. 5 illustrates a flow identifier (ID) establishment process according to an embodiment of the present invention.

Initial Packet Header Compression According to Embodiments of the Present Invention FIG. 5 illustrates a flow identifier (ID) establishment process according to an embodiment of the present invention. In 500, the given AT selects a given server. For example, the selected server can be associated with a service (e.g., a multicast or PTT service) that the given AT expects to use. Alternatively, the selected server can be any server that the given AT expects to communicate with and for which the given AT wishes to establish, with the RAN 120, compression of initial packets in subsequent communications. Below, assume that the selected server is the application server 170 for convenience of explanation.

In 505, the given AT determines the IP address of the application server 170. The IP address of the application server 170 may be determined based on an IP address discovery process (e.g., the given AT requests the IP address of the application server 170 via the RAN 120), the IP address of the application server 170 can already be known based on a previous discovery process, or the IP address of the application server 170 can be stored locally at the given AT in association with a service offered by the application server 170 (e.g., a multicast or PTT service).

Next, in 510, the given AT and the RAN 120 negotiate to determine (i) a flow identifier (ID) for identifying packets that are sent by the AT and intended for the application server 170, and (ii) a mapping protocol to be executed at the RAN 120 for converting packets marked with the flow ID into a format suitable to be routed to the application server 170. The negotiation of 510 can be implemented with a series of signals transferred between the RAN 120 and the AT. For example, the negotiation of 510 can include the given AT sending an uncompressed IPv6 packet to the RAN 120 without a payload or data portion, where the RAN 120 responds to the uncompressed IPv6 packet with a flow ID that may be used by the given AT to trigger a conversion, at the RAN 120, of a packet sent by the given AT and including the flow ID to the addressing portion indicated by the uncompressed IPv6 packet. In a further example, the negotiation of 510 can occur before the given AT actually wishes to communicate with the RAN 120 (e.g., before an announce message is received). Alternatively, the negotiation of 510 can occur during the first communication session between the given AT and the RAN 120 for packets to be transmitted to the application server 170.

After the negotiation of 510, the RAN 120 can add the Flow ID for the application server 160 to a lookup table maintained at the RAN 120, which may be stored in association with Flow IDs for one or more other network locations.

As discussed above, the configuration of an IPv6 packet can be given as follows:

| Addressing Portion | | | | Data Portion |
|---|---|---|---|---|
| Source | | Destination | | |
| S(1) | S(2) | D(1) | D(2) | DATA |

IPv6 Packet Configuration

In a first example, assume that the flow ID established in 510 is equal to the addressing portion for IPv6 packets minus the "prefix" portions for the source (i.e., the given AT) and the destination (i.e., the application server 170). In this example, the resultant format for packets transmitted by the given AT to the RAN 120 and intended for the application server 170 may be as follows:

| Flow ID Portion | Data Portion |
|---|---|
| S(2)     D(2) | DATA |

Example 1 of Packet With Flow Id

Accordingly, in the above-example, the flow ID corresponds to the typical IPv6 addressing portion with the prefix portions S(1) and D(1) being omitted. Further, the mapping protocol established in 510, as will be appreciated, is to re-insert S(1) and D(1) back in their appropriate positions of the packet. As will be further appreciated, in order to support the mapping protocol in this example, S(1) and D(1) are maintained at the RAN 120.

In a second example, assume that the flow ID established in 510 is dynamically established by the RAN 120. In this example, the resultant format for packets transmitted by the given AT to the RAN 120 and intended for the application server 170 may be as follows:

| Flow ID Portion | Data Portion |
|---|---|
| Flow ID # | DATA |

Example 2 of Packet With Flow Id

Accordingly, in the above-example, the flow ID corresponds to any value that may be assigned by the RAN 120 to distinguish transmissions from the given AT that are designated for the application server 170 from other transmissions. Further, in this example, the mapping protocol established in 510, as will be appreciated, is to replace the flow ID number with S(1), S(2), D(1) and D(2). As will be further appreciated, in order to support the mapping protocol in this example, S(1), S(2), D(1) and D(2) are maintained at the RAN 120.

In 515, the RAN 120 and the given AT again negotiate to determine the manner in which the given AT will configure the initial packet to convey, to the RAN 120, that the bits of the initial packet correspond to a compressed packet (e.g., a compressed IPv6 packet). In an example, the RAN 120 can signal, to the given AT, a compression flag to include in any compressed initial packet. As will be described below, the RAN 120 can, upon receiving the compressed initial packet, check whether the packet includes the compression flag, and then map the compressed initial packet to an uncompressed packet via the mapping protocol from 510 if the compression flag is identified.

In an alternative embodiment, the compression flag need not be used to convey this information to the RAN 120. Rather, the presence of the Flow ID within the compressed initial packet may be sufficient for the RAN 120 to determine that the bits of the initial packet require decompression. As will be appreciated, this embodiment may require the RAN 120 to analyze more bits within the initial packet as compared to an evaluation of only the compression flag to make this determination.

Once the compression flag, flow ID and mapping protocols are established in accordance with the process of FIG. 5, packets may be transmitted from the given AT as will now be described with respect to FIG. 6.

Figure 6:
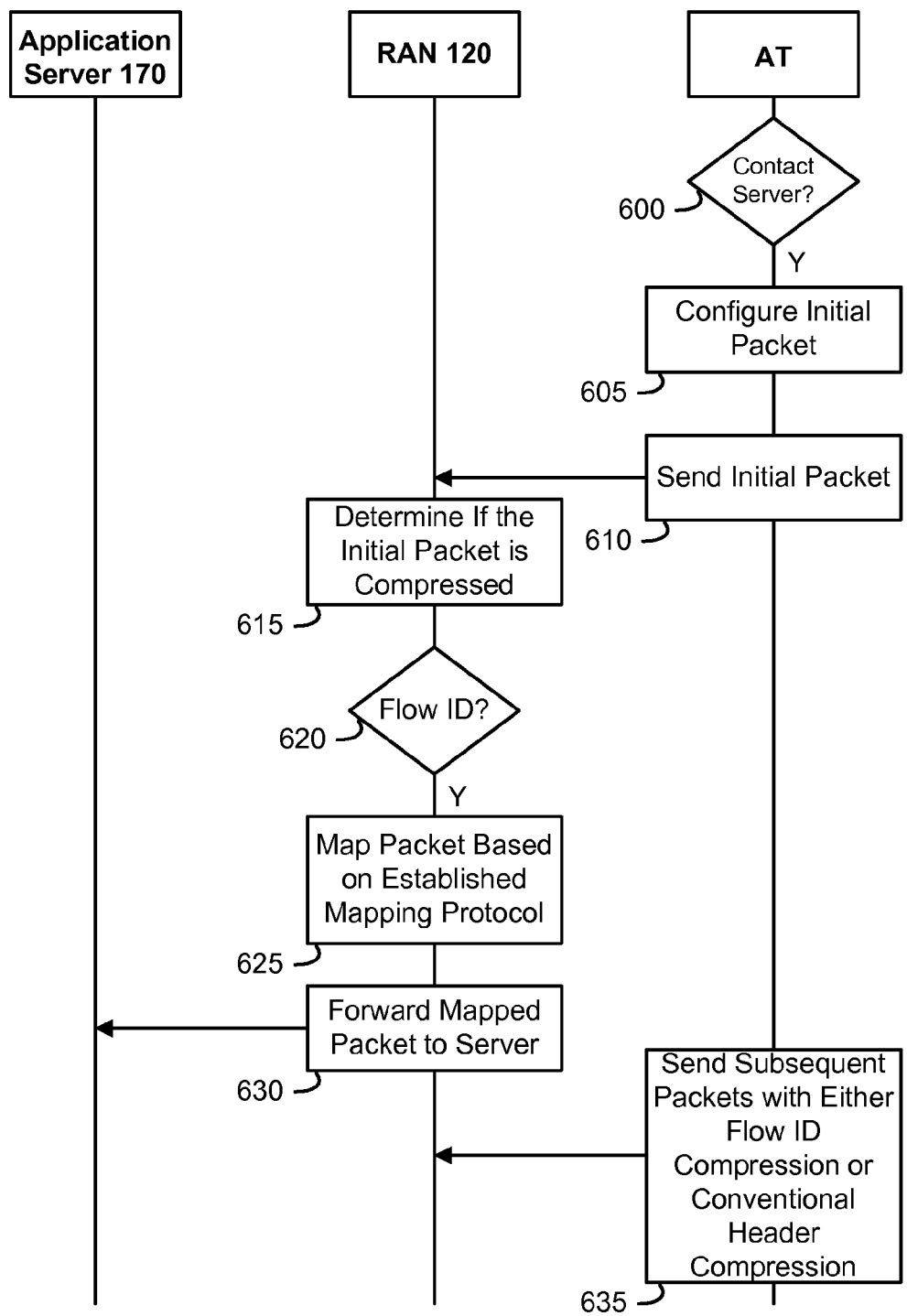
FIG. 6 illustrates a packet transmission process according to an embodiment of the present invention.

FIG. 6 illustrates a reverse link packet transmission process according to an embodiment of the present invention. In 600, the given AT determines whether to contact the server selected in 500 of FIG. 5 (i.e., the application server 170). In an example, the application server 170 can be a multicast server supporting multicasting operations within the system 100. In this example, the access terminal transmitting the packets in FIG. 6 can be either an originator of a multicast or PTT call, or alternatively can be a target access terminal responding to an announce message for the multicast or PTT call. In an alternative example, the access terminal transmitting the packets in FIG. 6 can be responding to an announce message announcing a unicast call, or can be initiating a unicast call (i.e., not in response to an announce message).

If the given AT determines to contact the application server 170, the given AT configures an initial packet in a compressed format as described above with respect to FIG. 5. In particular, the given AT generates a packet including the Flow ID established in 510 of FIG. 5, the data portion, and the compression flag established in 515 of FIG. 5. The configuring step 605 further forms the different packet portions in a manner (e.g., a given order or arrangement) to comply with the mapping protocol established in 510 of FIG. 5.

After configuring the initial packet, the given AT transmits the configured packet including the established flow ID in 610. The RAN 120 receives the transmitted packet and determines whether the received, initial packet from the given AT is compressed, 615. For example, the RAN 120 can attempt to detect whether the initial packet includes a compression flag indicating that the initial packet is in a compressed format, and can base the determination of 615 on whether the compression flag is detected. Alternatively, the FlowID included within the data stream can act as a trigger that indicates, to the RAN 120, the presence of a compressed packet even without the inclusion of a compression flag. As will be appreciated by one of ordinary skill in the art, if the RAN 120 is unable to detect the compressed nature of the packet, the RAN 120 may associate more bits in the data stream with the initial packet than actually belong to the initial packet (e.g., if the FlowID compression is 8 bytes versus an uncompressed format having 16 bytes, the RAN 120 may extract the full 16 bytes if the RAN 120 is unable to identify the packet as being compressed).

In 620, after determining that the received, initial packet is compressed, the RAN 120 determines whether a Flow ID is present within the packet. While not illustrated in FIG. 6, if the RAN 120 determines that no Flow ID is present within the packet, or is unknown, the RAN 120 can either ignore the packet and/or can notify the given AT that the packet was not received correctly. Otherwise, if the RAN 120 determines that the Flow ID is present in the transmitted packet and known to the RAN 120 (e.g., via a table lookup established in 510), the RAN 120 maps the packet based on the mapping protocol in 625 in order to generate a mapped packet that is suitable for routing to the application server 170. In 630, the RAN 120 forwards the mapped packet to the application server 170. Next, in 635, the given AT sends subsequent packets to the application server 170 via the RAN 120 either including the flow ID, or alternatively in accordance with conventional header compression (e.g., ROHC compression as discussed above). For example, in 635, the given AT may select the most efficient available header compression format for the transmission of the subsequent packets.

Further, while above-described embodiments of the present invention have generally been described with respect to IPv6 addressing protocols, it will be appreciated that other embodiments of the present invention may be directed to a compression of any well-known addressing protocol, such as IPv4. Further, while the application server 170 is above-described as being a multicast or PTT server, it will be appreciated that embodiments of the present invention need not be limited to a multicasting or PTT environment. For example, as discussed above, the packet compression techniques discussed above can be implemented in a unicast environment in a similar manner as a multicast environment. Also, with respect to PTT calls, the reverse link initial packet transmission can be transmitted either by an originator of the PTT call or by a target AT that receives an announce message for the PTT call.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of header compression within a wireless communications network, comprising:
   establishing, with an access network, a flow identifier (ID) and a mapping protocol to support a header compression for packets sent to the access network and intended for an application server, the mapping protocol being configured to convert packets including the flow ID into packets that conform with a given addressing protocol for routing to the application server, wherein the flow ID and the mapping protocol are established based on an uncompressed packet sent before a communication session with the access network is established; and
sending a stream of packets to the access network, wherein an initial packet of the stream of packets is configured to include the flow ID and to be in a compressed format of the given addressing protocol, and the compressed format is detected by the application server based at least on a length of bits of the flow ID.

2. The method of claim 1, wherein the given addressing protocol is internet protocol version 4 (IPv4).

3. The method of claim 1, wherein the given addressing protocol is internet protocol version 6 (IPv6).

4. The method of claim 1, wherein the application server is a push-to-talk (PTT) server.

5. The method of claim 1, wherein the flow ID is a reduced portion of an addressing portion associated with the given addressing protocol.

6. The method of claim 5, wherein the flow ID includes a first portion that uniquely identifies a given access terminal and a second portion that uniquely identifies the application server.

7. The method of claim 1, wherein the flow ID is dynamically assigned by the access network to distinguish between other transmissions and is not a reduced portion of an addressing portion associated with the given addressing protocol.

8. The method of claim 1, further comprising:
configuring the initial packet of the stream of packets to include a compression flag, the compression flag being configured to indicate, to the access network, that the initial packet of the stream of packets is in the compressed format.

9. The method of claim 1, further comprising:
establishing, with the access network, a compression flag for initial packets in streams of packets, the compression flag indicating to the access network that the initial packet in each stream of packets is in the compressed format.

10. The method of claim 1, further comprising:
sending a second packet of the stream of packets to the access network, the second packet including the flow ID and being in the same compressed format as the initial packet.

11. The method of claim 1, further comprising:
sending a second packet of the stream of packets to the access network, the second packet being in a different compressed format as the initial packet.

12. The method of claim 11, wherein the compressed format of the second packet is Robust Header Compression (RoHC), and the compressed format of the initial packet is not RoHC.

13. A method of header compression within a wireless communications network, comprising:
establishing, with an access terminal, a flow identifier (ID) and a mapping protocol to support a header compression for packets sent from the access terminal and intended for an application server, wherein the flow ID and the mapping protocol are established based on an uncompressed packet sent before a communication session with the access network is established;
receiving a stream of packets from the access terminal, wherein an initial packet of the stream of packets is configured to include the flow ID and to be in a compressed format of a given addressing protocol, and the compressed format is detected by the application server based at least on a length of bits of the flow ID;
converting the initial packet into a routing packet based on the mapping protocol, the converted routing packet conforming with the given addressing protocol; and
forwarding the converted routing packet to the application server based on the given addressing protocol.

14. The method of claim 13, wherein the given addressing protocol is internet protocol version 4 (IPv4).

15. The method of claim 13, wherein the given addressing protocol is internet protocol version 6 (IPv6).

16. The method of claim 13, wherein the application server is a push-to-talk (PTT) server.

17. The method of claim 13, wherein the flow ID is a reduced portion of an addressing portion associated with the given addressing protocol.

18. The method of claim 17, wherein the flow ID includes a first portion that uniquely identifies a given access terminal and a second portion that uniquely identifies the application server.

19. The method of claim 13, wherein the flow ID is dynamically assigned by the access network to distinguish between other transmissions and is not a reduced portion of an addressing portion associated with the given addressing protocol.

20. The method of claim 13, wherein the initial packet of the stream of packets includes a compression flag, the compression flag being configured to indicate, to the access network, that the initial packet of the stream of packets is in the compressed format.

21. The method of claim 13, further comprising:
establishing, with the access terminal, a compression flag for initial packets in streams of packets, the compression flag indicating to the access network that the initial packet in each stream of packets is in the compressed format.

22. The method of claim 13, further comprising:
receiving a second packet of the stream of packets at the access network, the second packet including the flow ID and being in the same compressed format as the initial packet.

23. The method of claim 13, further comprising:
receiving a second packet of the stream of packets at the access network, the second packet being in a different compressed format as the initial packet.

24. The method of claim 23, wherein the compressed format of the second packet is Robust Header Compression (RoHC), and the compressed format of the initial packet is not RoHC.

25. An access terminal, comprising:
a processor, comprising:
logic configured to establish, with an access network, a flow identifier (ID) and a mapping protocol to support a header compression for packets sent to the access network and intended for an application server, the mapping protocol being configured to convert packets including the flow ID into packets that conform with a given addressing protocol for routing to the application server, wherein the flow ID and the mapping protocol are established based on an uncompressed packet sent before a communication session with the access network is established; and
logic configured to send a stream of packets to the access network, wherein an initial packet of the stream of packets is configured to include the flow ID and to be in a compressed format of the given addressing protocol, and the compressed format is detected by the application server based at least on a length of bits of the flow ID.

26. The access terminal of claim 25, wherein the given addressing protocol is one of internet protocol version 4 (IPv4) or internet protocol version 6 (IPv6).

27. The access terminal of claim 25, wherein the flow ID is a reduced portion of an addressing portion associated with the given addressing protocol.

28. The access terminal of claim 27, wherein the flow ID includes a first portion that uniquely identifies a given access terminal and a second portion that uniquely identifies the application server.

29. The access terminal of claim 25, wherein the processor further comprises:
logic configured to configure the initial packet of the stream of packets to include a compression flag, the compression flag being configured to indicate, to the access network, that the initial packet of the stream of packets is in the compressed format.

30. The access terminal of claim 25, wherein the processor further comprises:
logic configured to send a second packet of the stream of packets to the access network, the second packet being in a different compressed format as the initial packet.

31. An access network, comprising:
a processor, comprising:
logic configured to establish, with an access terminal, a flow identifier (ID) and mapping protocol to support a header compression for packets sent from the access terminal and intended for an application server, wherein the flow ID and the mapping protocol are established based on an uncompressed packet sent before a communication session with the access network is established;
logic configured to receive a stream of packets from the access terminal, wherein an initial packet of the stream of packets is configured to include the flow ID and to be in a compressed format of a given addressing protocol, and the compressed format is detected by the application server based at least on a length of bits of the flow ID;
logic configured to convert the initial packet into a routing packet based on the mapping protocol, the converted routing packet conforming with the given addressing protocol; and
logic configured to forward the converted routing packet to the application server based on the given addressing protocol.

32. The access network of claim 31, wherein the given addressing protocol is one of internet protocol version 4 (IPv4) or internet protocol version 6 (IPv6).

33. The access network of claim 31, wherein the flow ID is a reduced portion of an addressing portion associated with the given addressing protocol.

34. The access network of claim 33, wherein the flow ID includes a first portion that uniquely identifies a given access terminal and a second portion that uniquely identifies the application server.

35. The access network of claim 31, wherein the initial packet of the stream of packets includes a compression flag, the compression flag being configured to indicate, to the access network, that the initial packet of the stream of packets is in the compressed format.

36. The access network of claim 31, wherein the processor further comprises:
logic configured to receive a second packet of the stream of packets at the access network, the second packet being in a different compressed format as the initial packet.

37. An access terminal, comprising:
means for establishing, with an access network, a flow identifier (ID) and a mapping protocol to support a header compression for packets sent to the access network and intended for an application server, the mapping protocol being configured to convert packets including the flow ID into packets that conform with a given addressing protocol for routing to the application server, wherein the flow ID and the mapping protocol are established based on an uncompressed packet sent before a communication session with the access network is established; and
means for sending a stream of packets to the access network, wherein an initial packet of the stream of packets is configured to include the flow ID and to be in a compressed format of the given addressing protocol, and the compressed format is detected by the application server based at least on a length of bits of the flow ID.

38. The access terminal of claim 37, wherein the given addressing protocol is one of internet protocol version 4 (IPv4) or internet protocol version 6 (IPv6).

39. The access terminal of claim 37, wherein the flow ID is a reduced portion of an addressing portion associated with the given addressing protocol.

40. The access terminal of claim 39, wherein the flow ID includes a first portion that uniquely identifies a given access terminal and a second portion that uniquely identifies the application server.

41. The access terminal of claim 37, further comprising:
means for configuring the initial packet of the stream of packets to include a compression flag, the compression flag being configured to indicate, to the access network, that the initial packet of the stream of packets is in the compressed format.

42. The access terminal of claim 37, further comprising:
means for sending a second packet of the stream of packets to the access network, the second packet being in a different compressed format as the initial packet.

43. An access network, comprising:
means for establishing, with an access terminal, a flow identifier (ID) and a mapping protocol to support a header compression for packets sent from the access terminal and intended for an application server, wherein the flow ID and the mapping protocol are established based on an uncompressed packet sent before a communication session with the access network is established;
means for receiving a stream of packets from the access terminal, wherein an initial packet of the stream of packets is configured to include the flow ID and to be in a compressed format of a given addressing protocol, and the compressed format is detected by the application server based at least on a length of bits of the flow ID;
means for converting the initial packet into a routing packet based on the mapping protocol, the converted routing packet conforming with the given addressing protocol; and
means for forwarding the converted routing packet to the application server based on the given addressing protocol.

44. The access network of claim 43, wherein the given addressing protocol is one of internet protocol version 4 (IPv4) or internet protocol version 6 (IPv6).

45. The access network of claim 43, wherein the flow ID is a reduced portion of an addressing portion associated with the given addressing protocol.

46. The access network of claim 45, wherein the flow ID includes a first portion that uniquely identifies a given access terminal and a second portion that uniquely identifies the application server.

47. The access network of claim 43, wherein the initial packet of the stream of packets includes a compression flag, the compression flag being configured to indicate, to the access network, that the initial packet of the stream of packets is in the compressed format.

48. The access network of claim 43, further comprising:
    means for receiving a second packet of the stream of packets at the access network, the second packet being in a different compressed format as the initial packet.

49. A non-transitory computer-readable medium including program code stored thereon, the program code being configured to operate within an access terminal, comprising:
    program code to establish, with an access network, a flow identifier (ID) and a mapping protocol to support a header compression for packets sent to the access network and intended for an application server, the mapping protocol being configured to convert packets including the flow ID into packets that conform with a given addressing protocol for routing to the application server, wherein the flow ID and the mapping protocol are established based on an uncompressed packet sent before a communication session with the access network is established; and
    program code to send a stream of packets to the access network, wherein an initial packet of the stream of packets is configured to include the flow ID and to be in a compressed format of the given addressing protocol, and the compressed format is detected by the application server based at least on a length of bits of the flow ID.

50. The computer-readable medium of claim 49, wherein the given addressing protocol is one of internet protocol version 4 (IPv4) or internet protocol version 6 (IPv6).

51. The computer-readable medium of claim 49, wherein the flow ID is a reduced portion of an addressing portion associated with the given addressing protocol.

52. The computer-readable medium of claim 51, wherein the flow ID includes a first portion that uniquely identifies a given access terminal and a second portion that uniquely identifies the application server.

53. The computer-readable medium of claim 49, further comprising:
    logic configured to configure the initial packet of the stream of packets to include a compression flag, the compression flag being configured to indicate, to the access network, that the initial packet of the stream of packets is in the compressed format.

54. The computer-readable medium of claim 49, further comprising:
    program code to send a second packet of the stream of packets to the access network, the second packet being in a different compressed format as the initial packet.

55. A non-transitory computer-readable medium including program code stored thereon, the program code configured to operate within an access network, comprising:
    program code to establish, with an access terminal, a flow identifier (ID) and a mapping protocol to support a header compression for packets sent from the access terminal and intended for an application server, wherein the flow ID and the mapping protocol are established based on an uncompressed packet sent before a communication session with the access network is established;
    program code to receive a stream of packets from the access terminal, wherein an initial packet of the stream of packets is configured to include the flow ID and to be in a compressed format of a given addressing protocol, and the compressed format is detected by the application server based at least on a length of bits of the flow ID;
    program code to convert the initial packet into a routing packet based on the mapping protocol, the converted routing packet conforming with the given addressing protocol; and
    program code to forward the converted routing packet to the application server based on the given addressing protocol.

56. The computer-readable medium of claim 55, wherein the given addressing protocol is one of internet protocol version 4 (IPv4) or internet protocol version 6 (IPv6).

57. The computer-readable medium of claim 55, wherein the flow ID is a reduced portion of an addressing portion associated with the given addressing protocol.

58. The computer-readable medium of claim 57, wherein the flow ID includes a first portion that uniquely identifies a given access terminal and a second portion that uniquely identifies the application server.

59. The computer-readable medium of claim 55, wherein the initial packet of the stream of packets includes a compression flag, the compression flag being configured to indicate, to the access network, that the initial packet of the stream of packets is in the compressed format.

60. The computer-readable medium of claim 55, further comprising:
    program code to receive a second packet of the stream of packets at the access network, the second packet being in a different compressed format as the initial packet.

* * * * *